(12) United States Patent
Le Buhan et al.

(10) Patent No.: US 8,336,106 B2
(45) Date of Patent: *Dec. 18, 2012

(54) METHOD TO CONTROL THE ACCESS TO CONDITIONAL ACCESS AUDIO/VIDEO CONTENT

(75) Inventors: Corinne Le Buhan, Les Paccots (CH); Holger Ippach, Lausanne (CH); Laura Fullton, Lausanne (CH); Ivan Verbesselt, Londerzeel (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 1132 days.

This patent is subject to a terminal disclaimer.

(21) Appl. No.: 12/043,665

(22) Filed: Mar. 6, 2008

(65) Prior Publication Data

US 2008/0219643 A1     Sep. 11, 2008

(30) Foreign Application Priority Data

Mar. 6, 2007   (EP) ..................................... 07103634

(51) Int. Cl.
   *G06F 7/04*         (2006.01)
(52) U.S. Cl. .............................. 726/27; 726/30; 380/201
(58) Field of Classification Search ........................ None
   See application file for complete search history.

(56) References Cited

U.S. PATENT DOCUMENTS

| | | |
|---|---|---|
| 6,256,741 B1 | 7/2001 | Stubblebine |
| 6,360,320 B1 | 3/2002 | Ishiguro et al. |
| 6,438,690 B1 | 8/2002 | Patel et al. |
| 6,443,361 B1 | 9/2002 | Klatt et al. |
| 6,636,975 B1 | 10/2003 | Khidekel et al. |
| 7,039,802 B1 | 5/2006 | Eskicioglu et al. |
| 7,146,412 B2 | 12/2006 | Turnbull |

(Continued)

FOREIGN PATENT DOCUMENTS

AU           751436          11/1999

(Continued)

OTHER PUBLICATIONS

European Search Report, European Patent Application No. EP 07 10 3634; Filing Date: Mar. 6, 2007.

(Continued)

*Primary Examiner* — Pramila Parthasarathy
(74) *Attorney, Agent, or Firm* — DLA Piper LLP US

(57) ABSTRACT

The present invention aims at solving the financial revenue loss due to the presence of digital video recorders that allow skipping the commercial breaks.

The solution is based on a method to control the access to conditional access audio/video content comprising at least one advertisement section, said content being played on a digital video recorder associated with a security module (SM) and being formed by at least an advertisement section and a main content section, this method comprising the steps of:
  defining a control information associated with the audio/video content, said control information being stored in the security module,
  updating the control information in the security module with condition information included in an Control Message relating to the advertisement section of the audio/video content,
  receiving by the security module of an Control Message relating to the main content section of said audio/video content and containing a condition information in relation with the stored control information,
  verifying that the condition information contained in the Control Message relating to the main content section match with the stored control information, and in the positive event, returning to the digital video recorder an authorization signal allowing the access the main content section of the audio/video content.

17 Claims, 1 Drawing Sheet

U.S. PATENT DOCUMENTS

| | | | |
|---|---|---|---|
| 7,225,164 | B1 | 5/2007 | Candelore et al. |
| 7,310,732 | B2 | 12/2007 | Matsuyama et al. |
| 7,380,133 | B2 | 5/2008 | Jaquier |
| 7,424,613 | B2 | 9/2008 | Han et al. |
| 7,720,351 | B2* | 5/2010 | Levitan .................... 386/250 |
| 7,895,633 | B2* | 2/2011 | Van Hoff et al. .............. 725/109 |
| 7,934,212 | B2 | 4/2011 | Lakhdhir |
| 8,028,332 | B2 | 9/2011 | Le Buhan et al. |
| 8,165,916 | B2* | 4/2012 | Hoffberg et al. ........... 705/14.53 |
| 2001/0020241 | A1 | 9/2001 | Kawamoto et al. |
| 2003/0041127 | A1 | 2/2003 | Turnbull |
| 2003/0154378 | A1 | 8/2003 | Hirano |
| 2004/0125959 | A1 | 7/2004 | Beugue et al. |
| 2005/0075986 | A1 | 4/2005 | You et al. |
| 2005/0209970 | A1 | 9/2005 | Shiba et al. |
| 2006/0020784 | A1 | 1/2006 | Jonker et al. |
| 2006/0200814 | A1 | 9/2006 | Kontinen et al. |
| 2007/0174617 | A1 | 7/2007 | Carrel |
| 2007/0256090 | A1 | 11/2007 | Hiron et al. |
| 2007/0256126 | A1 | 11/2007 | Erickson et al. |
| 2008/0247544 | A1 | 10/2008 | Candelore et al. |
| 2009/0070754 | A1 | 3/2009 | Ichikawa |
| 2009/0113414 | A1 | 4/2009 | Hamilton |

FOREIGN PATENT DOCUMENTS

| | | |
|---|---|---|
| DE | 10 2005 060 288 | 6/2007 |
| DE | 10 2006 016 121 | 4/2008 |
| EP | 1 078 524 | 2/2001 |
| EP | 1 326 173 A1 | 7/2003 |
| EP | 1 624 692 | 2/2006 |
| EP | 1 811 778 | 7/2007 |
| EP | 1 914 990 | 4/2008 |
| FR | 2 872 662 A1 | 1/2006 |
| WO | WO 98/56179 | 12/1998 |
| WO | WO 03/107589 | 12/2003 |
| WO | 2004/056116 A1 | 7/2004 |
| WO | WO 2004/112004 | 12/2004 |
| WO | 2005/124583 A1 | 12/2005 |
| WO | WO 2007/120892 | 10/2007 |

OTHER PUBLICATIONS

U.S. Appl. No. 12/364,535.

English language abstract of FR 2,872,662, published Jan. 6, 2006.

U.S. Appl. No. 11/373,214.

European Search Report issued in EP 08 15 1281, dated Aug. 21, 2008.

A. Eskicioglu et al., "An Overview of Multimedia content Protection in Consumer Electronics Devices", Signal Processing: Image Communication 16, pp. 681-699 (2001).

"Functional Model of a Conditional Access System", EBU Project Group B/CA, EBU Technical Review, pp. 64-77 (1995).

David J. Cutts, "DVB Conditional Access", Electronics and Communication Engineering Journal, pp. 21-27 (Feb. 1997).

Abstract of EP 1 811 778 published Jul. 25, 2007 with machine generated English translation.

Abstract of DE 10 2006 016 121 published Aug. 30, 2007 with machine generated English translation English Language Abstract of DE 10 2005 060 288 published Jun. 21, 2007.

English Language Abstact of WO 99/57901 (family member of EP 1 078 524) published Feb. 28, 2001.

* cited by examiner

METHOD TO CONTROL THE ACCESS TO CONDITIONAL ACCESS AUDIO/VIDEO CONTENT

INTRODUCTION

The present invention concerns the field of audio/video events watched by an end user from a digital video recorder.

BACKGROUND ART

Today, the use of DVR (Digital Video Recorder) or PVR (Personal Video Recorder) gives the possibility to watch movies that were broadcast or downloaded at a previous time. One important motivation for using such a recorder even for watching live television programs is the ability to pause and freeze the current program and continue to watch it later without missing the period where the user was not present.

One collateral effect of this main feature is the possibility to skip the advertisement spread in the movies. One can find in the market DVR devices that detect the advertisement periods and automatically jump forward to the subsequent movie segment. Since advertisement is an important means to finance the movie distribution, the spread of technical means to skip the adverts can lead to financial loss for the content provider.

In the document US200104982, it is described a method for encouraging the viewer to keep on watching the advertisements by carefully authoring the first or last number of seconds of a commercial break to provide a "teaser" to entice the viewer to watch multiple commercials during the commercial break, instead of skipping it using the fast forward or jump functions of the DVR. To this end, when the viewer selects a recorded program from the DVR's storage device for playback, an advertisement is first retrieved from the storage device and displayed before the main program.

However, the user is still free to skip the advertisement using the fast forward or the jump function of the DVR.

In payTV applications where content is subject to conditional access enforcement by a security module, the situation is the same: when a playback request is issued, the DVR sends the Entitlement Control Messages to the security module and, provided that the rights to watch the movie are entitled, the security module returns the key to decrypt the movie including the advertisements. The security module cannot lock the fast forward or jump function within the DVR.

In order to link the advertisement section with the valuable content, a solution was described in the document US2003/0154378. The broadcasted images contain two areas, an advertisement area and a valuable content area, the key to access the valuable area being watermarked in the advertisement area so that removing the advertisement area lead to forbidding the access to the valuable content.

In the document WO 2004/056116, the broadcast of advertisements on portable video device is duly accounted and charged to the advertiser. This document describe how collecting feedback information by watching the user's reaction such as modifying the sound level.

BRIEF DESCRIPTION OF THE INVENTION

The present invention aims at solving the financial revenue loss due to the presence of digital video recorders that allow skipping the commercial breaks.

The solution is based on a method to control the access to conditional access audio/video content played on a digital video recorder associated with a security module (SM) and being formed by at least an advertisement section and a main content section intended to be watched at different time, this method comprising the steps of:

receiving a initial message relating to the audio/video content (ACM) comprising the identification of an audio/video content and checking if control information (CTI) related to said audio/video content is stored in the security module (SM), in the negative event, creating a record comprising the identification of the audio/video content and an initialized control information (CTI), receiving a first message relating to the advertisement section of the audio/video content (ACM) comprising the identification of the audio/video content and updating information (UpI), updating the control information (CTI) related to said identified audio/video content in the security module (SM) with the updating information (UpI), said first message being received while receiving the advertisement section, receiving by the security module a second message included in the main content section (MCM) of said audio/video content and comprising the identification of the audio/video content and condition information (CI) in relation with the stored control information (CTI), verifying that the condition information (CI) contained in the second message matches with the stored control information (CTI), and in the positive event, returning to the digital video recorder an authorization signal allowing the access the main content section of the audio/video content.

To this end, the audio/video content contains mainly two types of Control Messages, i.e. a first message related to advertisement section of the content and a second message related to the main content section (e.g the movie itself). In the first message, condition data are present and are interpreted by the security module. These condition data will set (or update) the control information in such a state that at a later stage, when the second message related to the main content section of the content is processed, the condition information contained in the second message is compared with the control information contained in the security module. In case that the verification matches, the security module will grant access to the content by returning to the digital video recorder the necessary authorization information.

The authorization information can be the key to decrypt the main content section or an authorization information to the digital video recorder to inform it that the playback of the main content section is allowed.

According to a particular embodiment, an initial message is broadcasted prior to the first messages in order to initialize a record in the security module, said record comprising the identification of the broadcasted signal.

BRIEF DESCRIPTION OF THE DRAWINGS

The present invention is described in the attached figures in which.

DETAILED DESCRIPTION OF THE INVENTION

Figure 1:
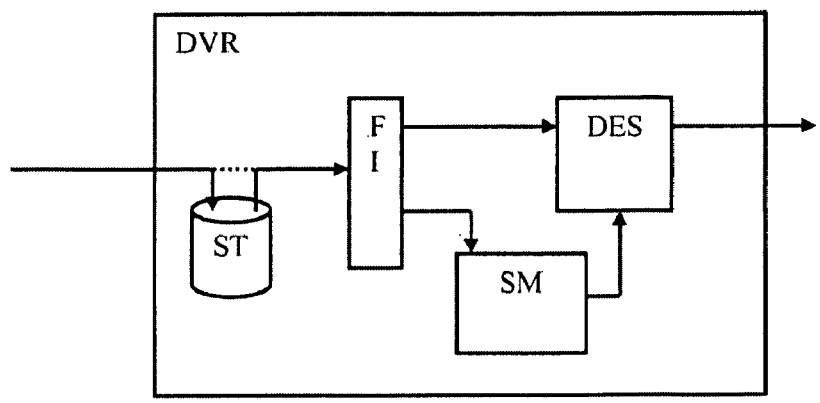
FIG. 1 shows a block diagram of the digital video recorder DVR.

In the FIG. 1, a digital video recorder DVR is schematically illustrated. It comprises a storage media ST in the form of a hard disk of large capacity, a filtering unit FI, a security module SM and a descrambler/decompression module DESC. The filtering unit FI extracts the messages intended for the security module SM from the data stream representing the content.

The security operations are carried out in a security module SM associated to the digital video recorder. This type of security module can be produced in particular according to four different forms. One of these consists in a microprocessor card, a smart card, or more generally an electronic module (taking the form of a key, of a badge, . . . ). This type of module is generally removable and connectable to the digital video recorder. The most used form is the one with electric contacts, but does not exclude a connection without contact, for example of the ISO 14443 type.

A second known form consists in an integrated circuit chip, generally placed in the digital video recorder printed circuit board in a definitive and irremovable way. An alternative is made up of a circuit wired on a base or connected such as a SIM module connector.

In a third form, the security module is integrated into an integrated circuit chip that also has another function, for example in a descrambling module of the decoder or the microprocessor of the decoder. The security module is therefore a portion of a larger Silicon circuit.

In a fourth embodiment, the security module is not realized in hardware, but rather its function is implemented only by software. Known techniques can be used to protect this software from tampering, by obfuscation for example.

Although the security level differs, given that in the four cases the function is identical, the term security module will be used in what follows regardless of the way in which its function is realized or the form that can be taken by this module.

The digital video recorder DVR can act as simple set-top-box, i.e. receiving the data stream and processing it without storing it. The storage unit ST can be used in various ways. According to a first embodiment, the storage unit ST is used for time-shifting operation. The data stream is stored in the storage unit ST and read at the same time at a different location. The read operation usually erases the portion read in order to not saturate the storage unit even right after the read operation or at a predefined later time.

The storage unit ST according to a second embodiment is used for pushing a content from the distribution network to the unit. In the push operation, the selection of the content to be stored is made by the provider, possibly taking into account the user's preferences. The content is pushed on the storage unit preferably at a time when the digital video recorder is not used.

Alternately, the content can be stored in the storage unit pursuant a user's order. The content is purchased by the user and sent to the storage unit.

The content contains at least one advertisement section and a main section. Both sections can form a single file or can be split into different files, for example in a embodiment using advertisement profile. The present invention aims at linking the viewing of the advertisement section to the playback of the main content section (the movie itself).

Once the security module receives an initial message, a record is created and associated with the event identification contained in the initial message. The record created contains a free space to store the updating information (a key or a counter) used in relation with the main content section.

Once the security module receives a first message, it decrypt it according to a transport key and process the updating information. It is to be noted that the initial message can be a first message received for the first time, the security module creating the record associated with the identification of this event and processing the updating information.

For subsequent first messages or second messages, the identification of the event contained in these message is compared with the identification in the record stored so that a given record in the security module will be updated (ad section) or compared (main section) only with messages related to the same event.

The initial message can contains an expiration date at which the record created can be deleted. The security module, when creating a new record can scan the previous records to check the ones that are expired and can overwrite said records.

Partial Key Solution

This advertisement section contains at least one Control Message that comprise updating information UpI that will interact with the control information CTI. This control information is created at the back-end while the authorization data is processed related to the content. A right is stored within the security module that comprises an identification of the event. Beside this identification, the access rights are stored that define the usage rules (e.g. number of viewings allowed). In addition to the access rights, an additional register is assigned to this content in the security module, in order to store the control information.

These authorization data are loaded for example by means of an entitlement management message (EMM). This management message can be broadcast or unicast depending on the network capability, and it can be encrypted with a unique key pertaining to the security module of a particular digital video recorder. For instance, this management message can be loaded while the digital video recorder is in communication with the management system (via Internet for example).

In parallel, the access keys (CW control words) necessary to descramble any portion of the content are embedded in Control Messages (CM) that are transmitted alongside the content. In order to enforce the advertisement playback control, different types of Control Messages are transmitted alongside respectively the advertisement sections and the main content sections.

In this first embodiment, the updating information in the Control Message of an advertisement section contains all or part of the access key(s) that are necessary to decrypt the main content section of the content. This key data can be embedded in one Control Message or split over several messages that are distributed along the advertisement section. It is therefore necessary to send all the Control Messages associated with the advertisement section (ACM) to the security module so that the access key is built from them. Failing to do so results in the inability of the security module to subsequently provide the access key to descramble the content corresponding to the matching main content section. The access key can be divided into several parts and each updating information is necessary to form the content key.

The updating information is made of a first value K1, which is combined (for instance using any appropriate function, f, denoted by the operator $\otimes$) with the second updating info K2 and so on to form the access key CTK.

$$CTK = K1 \oplus K2 \oplus K3 \oplus \ldots Kn$$

The intermediate result is stored in the security module SM in the control information CTI. Each updating information Kn is necessary to form the final access key. If one is missing the final access key will be wrong.

In order to avoid processing twice the same Control Message and thus having at the end a wrong result, the control information can contain an index that stores the index of the current Control Message. As a consequence, the security module will not accept to update the control information from a Control Message having the same or a lower index than expected. At the end of the advertisement section, the control information CTI is the key to decrypt the subsequent part of the content, i.e. the main content section.

Other combination of the information contained in the various Control Messages can be used such as using the second and following keys K2 . . . Kn to encrypt the first information received K1

$$CTK=(((((K1)K2)K3)\ldots)Kn$$

In this case, the access key is replaced by this calculated access key CTK and will be valid for the current main content section until a new advertisement section is detected in the content. In case that different access keys are used for the different main content sections, they are stored in the security module to be resumed in case that the user request a rewind function in a previous main content section.

It is worth noting that the Control Message CM is both encrypted and preferably signed to ensure that it has not been tampered with. As a result, of the encryption only the security module can access and decrypt this message. The signature makes use of asymmetric cryptography to authenticate the message; the message should be correctly signed with a private key only present in the management system. The security module checks the validity of the message with the public key of the message issuer, the management system. If the signature does not match, the message will not be processed.

Counter Control

In the simplest implementation mode, the control information is in fact a counter while the condition information can be as simple as a threshold value to be met by the stored counter.

Each (different, see above) Control Message (CM) of the advertisement section will then modify the counter. The simplest way is to count the messages and ensure that each message is processed only once to increment the counter. This is achieved according to various modes.

Index mode: beside the counter value, an index corresponding to the index of the Control Message is stored. An increment of the counter is only allowed if the current message has in index following the stored index. This forbids a wild increment of the counter from for example the first message to the last message of the advertisement section as the result of a jump command by the end user.

Setting mode: the Control Message contains the value of the counter to be set. The counter is updated with the value contained in this message only if the counter value is one unit before the value.

Table mode: the Security Module stores a table with predefined location for the advertisement CMs. Each CM that is decrypted results in setting a value, e.g. 1, in the matching table entry. The advertisement section is considered to be viewed only once the table entries are all been filled up to the table index matching the condition information carried by the associated main content MCM.

Figure 2:
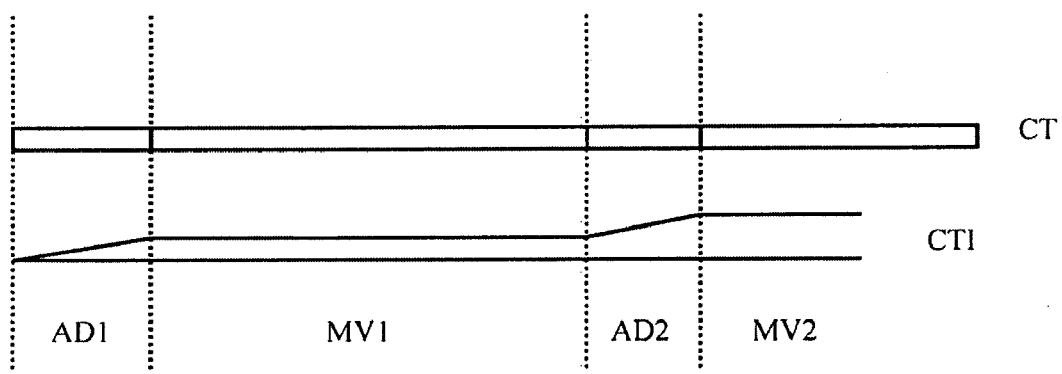
FIG. 2 shows an example of how to handle the advertisement conditions

The FIG. 2 shows the control information CTI in the form of a counter increased during the advertisement section AD1.

In order to make sure the whole advertisement period is viewed and not only part of it, which would result in a partial, useless key, the Control Message of the matching main content section MV1 contains an additional condition information CI corresponding to the final expected value of the control information CTI. The authorization signal is returned by the security module only once the value of the control information CTI is greater than or equal to the condition information CI.

The CMs associated with the main content section may still contain:
  Either a part CK of the access key CW for this section, to be combined with the calculated key CTK resulting from the handling of the former CMs from the advertisement section;
  Or the access key CW for this section, itself encrypted (CK is the encrypted CW), symmetrically or asymmetrically, with the calculated key CTK resulting from the handling of the former CMs from the advertisement section;
  Or specific data, which must be combined with the calculated information resulting from the handling of the former CMs from the advertisement section to compute the correct descrambling key CW for this section.

This results in the formula: CW=f(CTK,CK)

It would by apparent that a rewind to the beginning of the content has no impact on the limitation to jump over the advertisement as long as the control information stores a value higher or equal than the threshold (condition information CI) contained in the Control Message of the main content section.

In case that a second advertisement section AD2 is present in the content, it is also necessary to prevent the jump from the first main content section MV1 to the second useful MV2, without viewing the second advertisement section AD2. To this end, the condition information attached to the Control Message of the second main content section needs to be of a higher value than formerly. Typically, this value cumulates the counts for all the former advertisement periods and not only the latest one. Similarly, the control information handled by the security module is not reset. In case that the second advertisement section AD2 is watched, the control information will be incremented up to the second threshold value requested by the second main content section MV2.

From that point, any rewind within the first or the second main content sections is completely free and no limitation is imposed.

In practice, it may not always be possible to derive the descrambling key CW for the main content section from the advertisement section data because of the constraints it imposes on the broadcast back end generating the keys, as well as on the receiver that would have to bufferize the advertisement sections for any possible channel the user may tune in channel surfing mode. Those limitations are especially relevant in a live broadcast environment compliant with the DVB simulcrypt standard [Digital Video Broadcasting (DVB); DVB SimulCrypt: Part 1: Head-end architecture and synchronization," European Telecommunications Standards Institute, ETSI Technical Report TS 101 197-1 vl. 1.1 June 1997.], but also in VOD applications or DVR implementations where a single content key is used rather than the rotating crypto-period keys (control words). In the latter case, the Control Message CM becomes the equivalent of a content license.

In case that the same key is used throughout the content, the same principles can still apply by handling the usage rules or access criteria associated with later DVR content playback that are typically carried within the Entitlement Control Message, rather than handling the actual content keys. In that case, typically, at least one different Entitlement Control Message still needs to be associated with each section (advertisement or main content section) even when a single content key is used to descramble the content.

The usage rules or the access criteria from the Control Message specify that when the main content section is resumed, an authorization request is performed with the security module. This latter return on GO/No GO to the DVR depending on the control information CTI and the condition information contained in the DVR request. The license or Entitlement Control Message that is attached with the main content section of the content describes the usage rules as well as the condition information to be met as a condition for playback, while the license or Entitlement Control Message that is attached with the matching advertisement section describes the usage rules as well as the update information to be used by the security module to update the stored control information.

According to this first example, the main content section following the advertisement section cannot be played back if the ad has not been watched totally. In order to make sure that the whole advertisement section is viewed, the associated content license may be split in as many segments as necessary and the combination of all segments is then required to properly update the stored control information, which prevents the end user to skip any single segment in the advertisement section.

It is to be noted that the condition information contained in the Entitlement Control Message related to the main content section can contain a threshold value lower that the maximum value possibly met by the combination of all messages corresponding to the matching advertisement section. For instance the advertisement section may be divided in 25 advertisement segments out of which a minimum of 20 are required to be viewed (viewing any 20 segments out of the 25 segments will result in a stored control information counter of value 20).

Another possibility is to vary the threshold value along the main content section by associating main segments to the latter as well, each segment been associated with an Entitlement Control Message or content license that carries a different condition information (threshold value). Let's take as an example that the nominal value of the control information is 25 when all the 25 advertisement segments have been watched. The first Entitlement Control Message of the main content section may then contain 25 as threshold, and the next Entitlement Control Message of the main content section, located 1 minute later, will contain 24 and so on. Thus, if a user has partially watched the ad, e.g. the control information counter is set to 20, only the first 5 minutes will be blackout. Thanks to the condition information contained in the Entitlement Control Messages of the main content section, it becomes then possible to adjust precisely the consequence of a partial viewing of the ad.

Timing Control

The last problem to solve is how to avoid the user to feed the security module SM with all advertisement Entitlement Control Messages in accelerated mode, in such a way that the segments are all processed but not viewed at real speed, thus failing to pass the advertisement message to the user. A first solution was published in the document EP 1 575 293 which adds a latency time after each message. The notion of time could be also present in the security module, even if no real time is available and only a tick counter is used. Generally, the internal time of the security module, if not directly fed from the decoder, can be extracted from the various messages (ECM, EMM). Between two such messages, the security module, thanks to its working clock, can generate an internal timer to calculate the elapsed time between two messages.

In an Entitlement Control Message related to the advertisement section, one can add a time duration condition, that has to be elapsed before the new message can be loaded and/or processed by the Security Module. This limitation will block any attempt to feed the security module with all Entitlement Control Messages in accelerated mode before starting to watch the content. In an alternate embodiment, the security module is predefined with a minimum window time during which no new ECM messages is processed, e.g. 5 seconds. The management system, knowing this limitation, will divide the advertisement section into parts having more that 5 seconds.

Audio Control

In order to prevent the fast forwarding of the advertisement messages, according to another embodiment, the Entitlement Control Messages related to the advertisement section are attached with the audio data stream rather than the video data stream, in accordance with the MPEG-2 systems specification (ISO/IEC 13818-1:2000 Information technology—Generic coding of moving pictures and associated audio information). Indeed, usually, when fast forward operation is activated, the audio stream is skipped so the messages associated with it will not be processed by the security module. This is another way to avoid feeding the security module with messages without really watching the corresponding section.

OTHER ADVANTAGES

Thanks to this architecture, it is also possible for the content provider to offer different content purchase models corresponding to more or less restrictive advertisement use. In case that the user is ready to pay a different price or is member of a particular subscription, the Entitlement Management Message (EMM) sent to the security module SM of its DVR will not only contain the right for this content but also the value(s) of the associated control information or some information that can be used to derive the proper value(s). For instance, to fully disable the ad enforcer mechanism, the management message will contain the highest value of the control information, so that it no longer requires the update information to be read from the advertisement section entitlement control messages.

In addition, in case that the content is watched again one day later, according the policy in use, the control information attached to this content stored in the security module still contains the maximum value and the audio/video content can be viewed without limitation, i.e. the user is only forced once to watch the advertisements over the movie lifetime.

The invention claimed is:

1. A method to control access to conditional access audio/video content played on a digital video recorder associated with a security module, the audio/video content being formed by at least an advertisement section and a main content section intended to be watched at time different from a time at which the advertisement section is watched, the method comprising the steps of:

receiving by the security module an initial message relating to the audio/video content, the initial message comprising an identification of the audio/video content and creating a record comprising the identification of the audio/video content and initialized control information if no control information is stored in the security module when the initial message is received;

receiving by the security module a first message relating to the advertisement section of the audio/video content, the first message comprising the identification of the audio/video content and updating information and updating the control information related to said identified audio/video content in the security module in accordance with the updating information, said first message being received while the digital video recorder is playing the advertisement section;

receiving by the security module a second message included in the main content section of said audio/video content and comprising the identification of the audio/video content and condition information relating to the stored control information;

verifying that the stored control information satisfies the condition information contained in the second message and returning to the digital video recorder an authorization signal allowing access to the main content section of the audio/video content if the stored control information satisfies the condition information.

2. The method of claim 1, wherein the authorization signal is an access key to enable the access of the main content section and is obtained by combining at least part of the Control Message of the main content section and the control information obtained while processing at least one Control Message relating to the advertisement section.

3. The method of claim 1, wherein the authorization signal is an access key to enable the access of the main content section and is contained in the control information, said access key is composed while processing at least one first message relating to the advertisement section.

4. The method of claim 1, wherein the advertisement section contains several first messages, the processing of each of these messages being necessary to result in control information sufficient to satisfy the condition.

5. The method of claim 1, wherein the authorization signal informs the digital video recorder that the processing of the main content section is allowed.

6. The method of claim 1, in which the control information is a counter in the security module.

7. The method of claim 6, wherein the control information is updated each time a different first message of the advertisement section is processed.

8. The method of claim 6, wherein the counter is only updated if the updating information in the first message related to the advertisement section meets a counter condition.

9. The method of claim 6, wherein a plurality of first messages relating to the advertisement section and a plurality of second messages relating to the main section are received, and wherein the method further comprises the step of assigning a different condition information in the second messages of the main content section.

10. The method of the claim 1, wherein the first message of the advertisement section is bound with the audio part of the content.

11. The method of the claim 1, wherein the initial message and the first message are the same message.

12. A security module for controlling the playback of audio/video content comprising at least one advertisement section and a main content section, the security module comprising a control information dedicated to an audio/video content, the security module being configured to receive and update the control information with updating information included in a Control Message relating to the advertisement section of the audio/video content, receive a Control Message relating to the main content section of said audio/video content and containing a condition information in relation with the stored control information and compare if the condition information contained in the Control Message relating to the main content section matches with the stored control information, and in the positive event, to return an authorization signal to grant access to the main content section of the audio/video content.

13. A device for controlling access to audio/video content comprising:

a digital video recorder, the digital video recorder having a storage device for storing audio/video content, the audio/video content comprising an advertisement section and a main content section; and a security module connected to the digital video recorder; wherein the digital video recorder is configured to perform the steps of transmitting to the security module a first message during playback of the advertisement section, the first message comprising an identification of the audio/video content and updating information, transmitting to the security module a second message during playback of the main content section, the second message comprising the identification of the audio/video content and condition information relating to the stored control information;

wherein the security module is configured to perform the steps of receiving the first message from the digital video recorder and updating control information stored in the security module relating to the audio/video content identified in the first message;

receiving the second message from the digital video recorder;

determining whether the stored control information satisfies the condition information contained in the second message; and returning to the digital video recorder an authorization signal allowing access to the main content section of the audio/video content if the stored control information satisfies the condition information.

14. The device of claim 13, wherein the authorization signal is an access key to enable the access of the main content section and is obtained by combining at least part of the control message of the main content section and the control information obtained while processing at least one control message relating to the advertisement section.

15. The device of claim 13, wherein the authorization signal is an access key to enable the access of the main content section and is contained in the control information, the security module being configured to compose the access key while processing at least one first message relating to the advertisement section.

16. The device of claim 13, wherein the control information is a counter in the security module.

17. The device of claim 16, wherein the counter is updated each time a different first message from the advertisement section is processed.

* * * * *